UNITED STATES PATENT OFFICE.

JOHN H. WRIGHT, OF LOUISVILLE, KENTUCKY.

IMPROVEMENT IN COMPOSITIONS FOR MAKING IMITATION MARBLE.

Specification forming part of Letters Patent No. 154,163, dated August 18, 1874; application filed June 13, 1874.

*To all whom it may concern:*

Be it known that I, JOHN H. WRIGHT, of Louisville, in the county of Jefferson, in the State of Kentucky, have invented a new and useful Improvement in Cements for Making Imitation Marbles, of which the following is a specification:

The invention consists of imitation marble produced from a mixture of calcined gypsum hydraulic-cement rock, sugar of lead, and alum, together with a coloring matter, preferably dry mineral paint.

In preparing this compound I take gypsum-rock, crystallized, and calcine it in a flame-kiln until its quick-setting property is destroyed. I calcine in a similar manner hydraulic cement, but just before it is ready to be withdrawn from the furnace I add to it sufficient copperas to change the lime contained therein from a carbonate to a sulphate. The gypsum and cement are then drawn from the kiln, ground and bolted, and to them are added sugar of lead and alum, in about the following proportions: Prepared gypsum, say, fifty pounds; hydraulic cement, say, fifty pounds; sugar of lead, say, three pounds; alum, say, three pounds. These ingredients are well mixed together to form a mass, and when this is molded into forms and dried it can be polished like and resembles marble. The hydraulic cement serves as a backing or filling for the gypsum.

Any desired shade or color can be obtained by the use of dry mineral paints incorporated in the compound.

Having thus described my invention, I claim—

The herein-described compound for making imitation marble, composed of gypsum, hydraulic cement, sugar of lead, and alum, mixed in the proportions and manner set forth.

JOHN H. WRIGHT.

Witnesses:
 FRANK PARDON,
 JOHN TEXTOR.